US012783998B2

(12) United States Patent
Karmakar et al.

(10) Patent No.: US 12,783,998 B2
(45) Date of Patent: Nov. 3, 2026

(54) SYSTEM AND METHOD FOR ELECTRONIC PLANOGRAM GENERATION

(71) Applicant: Walmart Apollo, LLC, Bentonville, AR (US)

(72) Inventors: Somedip Karmakar, Bengalore (IN); Ashish Gupta, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 236 days.

(21) Appl. No.: 18/812,382

(22) Filed: Aug. 22, 2024

(65) Prior Publication Data

US 2024/0412163 A1 Dec. 12, 2024

Related U.S. Application Data

(63) Continuation of application No. 16/533,102, filed on Aug. 6, 2019, now abandoned.

(Continued)

(30) Foreign Application Priority Data

Aug. 6, 2018 (IN) ............................. 201811029541

(51) Int. Cl.
*G06Q 20/20* (2012.01)
*G06Q 10/067* (2023.01)
(Continued)

(52) U.S. Cl.
CPC ....... *G06Q 10/0875* (2013.01); *G06Q 10/067* (2013.01); *G06Q 10/08724* (2025.08)

(58) Field of Classification Search
CPC ............. G06Q 10/0875; G06Q 10/067; G06Q 10/08724
See application file for complete search history.

(56) References Cited

U.S. PATENT DOCUMENTS 7,689,456 B2 3/2010 Schroeder et al.
7,734,495 B2 6/2010 Klaubauf et al.
(Continued)

FOREIGN PATENT DOCUMENTS

AU 2010202163 B2 1/2011

OTHER PUBLICATIONS

"When does cross-space elasticity matter in shelf-space planning? A decision analytics approach"; Kai Schaal, Alexander Hübner, https://doi.org/10.1016/j.omega.2017.08.015 (Year: 2017).*
(Continued)

*Primary Examiner* — Michael Jared Walker
*Assistant Examiner* — Matthew S Weronski
(74) *Attorney, Agent, or Firm* — Fitch, Even, Tabin & Flannery LLP

(57) ABSTRACT

Systems and methods for generating an electronic planogram optimized for space elasticity calculating a space elasticity include training a constrained linear regression model using a first training dataset, training a multiple non-linear regression model based on a second training dataset including, training a non-linear multiple-constraint mixed integer optimization model based at least in part on an output of the constrained linear regression model and an output of the multiple non-linear regression model, and generating an electronic planogram optimized for space elasticity. For each item category, a space elasticity is determined by fitting the constrained linear regression model, the multiple non-linear regression model is applied to determine a cross-space elasticity, and the non-linear multiple-constraint mixed integer optimization model generates a category space allocation. The category space allocation for each item category is aggregated to generate the electronic planogram. The electronic planogram is validated based on received sales data.

20 Claims, 6 Drawing Sheets

Related U.S. Application Data

(60) Provisional application No. 62/773,611, filed on Nov. 30, 2018.

(51) Int. Cl.
*G06Q 10/087* (2023.01)
*G06Q 10/0875* (2023.01)

(56) References Cited

U.S. PATENT DOCUMENTS

| | | | | |
|---|---|---|---|---|
| 8,032,406 | B2 | 10/2011 | Ouimet | |
| 8,108,249 | B2 | 1/2012 | Schroeder | |
| 8,838,469 | B2 | 9/2014 | Bottom | |
| 2003/0200129 | A1 | 10/2003 | Klaubauf et al. | |
| 2004/0059560 | A1 | 3/2004 | Gardner et al. | |
| 2007/0050235 | A1 | 3/2007 | Quimet et al. | |
| 2008/0288327 | A1 | 11/2008 | Watarai et al. | |
| 2010/0318403 | A1 | 12/2010 | Bottom | |
| 2011/0035257 | A1 | 2/2011 | Solanki et al. | |
| 2012/0317059 | A1 | 12/2012 | Joshi et al. | |
| 2014/0025420 | A1 | 1/2014 | Joshi et al. | |
| 2014/0058781 | A1 | 2/2014 | Padmanbhan et al. | |
| 2014/0289009 | A1 | 9/2014 | Campbell | |
| 2014/0324532 | A1 | 10/2014 | Ghosh et al. | |
| 2015/0248630 | A1 | 9/2015 | Ramanan et al. | |
| 2015/0379532 | A1 | 12/2015 | Liu | |
| 2016/0335586 | A1* | 11/2016 | Panchamgam | G06Q 10/087 |
| 2017/0116624 | A1 | 4/2017 | Moore et al. | |
| 2020/0410376 | A1* | 12/2020 | Zhou | G06F 18/27 |

OTHER PUBLICATIONS

Jens Irion, et al., "A piecewise linearization framework for retail shelf space management models," European Journal of Operational Research, vol. 222, Issue 1, (Year: 2012), pp. 122-136.
K. Schaal et al., "When does cross-space elasticity matter in shelf-space planning? A decision analytics approach," Elsevier, Omega 80 (Year: 2017) pp. 135-152.
C. Liang et al., "A Bi-Objective Mode for Shelf Space Allocation Using a Hybrid Genetic Algorithm," Proceedings of International Joint Conference on Neural Networks, Orlando, Florida, Aug. 12-17, 2007, 6 pages.
Ruibin Bai Research, "Shelf space allocation," pp. 1-4.
L.K. Chu, An efficient approach for shelf space planning and display area allocation in convenience stores, 2009 IEEE, Department of Industrial and Manufacturing Systems Engineering, The University of Hong Kong, 2009, pp. 874-878.
International Search Report and Written Opinion Issued in corresponding International Application No. PCT/US2019/045309, Oct. 11, 2019.
Chandon et al., "Does-In-Store Marketing Work? Effects of Number and Position of Shelf Facings on Brand Attention and Evaluation at the Point of Purchase," Journal of Marketing, vol. 73, Nov. 2009, pp. 1-17.
Dreze et al., "Self management and Space Elasticity," Journal of Retailing, 70(4), pp. 301-326, retrieved Nov. 12, 2019.
J. Hansen et al., "Retail Shelf Allocation: A Comparative Analysis of Heuristic and Meta-Heuristic Approaches," Journal of Retailing, 86(1), 2010, pp. 94-105.
Manu Krishna, "The new space race: how data science can determine how much shelf space to assign each product," Nov. 2017, Trax, pp. 1-6.
Maria Teresa Peixolo Braga Bianchi de Aguiar, "The Retail Shelf Space Allocation Problem: New Optimization Methods Applied to a Supermarket Chain," 2015, pp. 1-154.
International Search Report and Written Opinion Issued in corresponding International Application No. PCT/US2019/045308, Oct. 22, 2019.

* cited by examiner

SYSTEM AND METHOD FOR ELECTRONIC PLANOGRAM GENERATION

CROSS-REFERENCE TO RELATED APPLICATIONS

This application is a continuation of U.S. patent application Ser. No. 16/533,102, filed Aug. 6, 2019, and entitled "SYSTEM AND METHOD FOR ITEM CATEGORY FOOTAGE RECOMMENDATION," which claims the priority to Indian Provisional Application No. 201811029541, filed Aug. 6, 2018, and U.S. Provisional Application No. 62/773,611, filed Nov. 30, 2018, contents of each of which are incorporated by reference herein.

BACKGROUND

1. Technical Field

The present disclosure relates to space planning, and more specifically to a system and method for item category footage recommendation.

2. Introduction

Shelf space is a scarce resource for a retailer. Shelf space allocation may involve the distribution of appropriate amount of shelf space among different item categories, together with their locations, in a store in such a way that the total profits and/or customer satisfaction may be maximized. Due to the limited shelf space, planograms may be one of the most important aspects that are used to improve financial performance. Planograms are a subset of the wider domain of space planning which may include more well-known research areas such as bin packing and knapsack problems. Electronic planograms can be also used for inventory control and vendor relation improvement. Further, a computer system for managing the shelf space can run inefficiently due to undesirable space planning. In addition, existing computer models for generating electronic planograms are inefficient and inaccurate.

There is a need for correlating relationship between space and sales both individually for each item category as well as their inter-relationships to maximize total profit of item categories in a department, and to improve the computer system for managing the shelf space.

SUMMARY

A method of computer modeling a retail environment for performing concepts disclosed herein can include calculating a space elasticity for an item category in a retail store, using a constrained linear regression model; calculating a cross-space elasticity for the item category in the retail store, using a multiple non-linear regression model; generating a category space allocation for the item category in the retail store, using a non-linear multiple-constraint mixed integer optimization model, based on the space elasticity of the item category and the cross-space elasticity of the item category; and generating an electronic planogram for the retail store, based on the category space allocation of the item category.

A system of computer modeling a retail environment configured as disclosed herein can include: a processor; and a computer-readable storage medium having instructions stored which, when executed by the processor, cause the processor to perform operations comprising: calculating a space elasticity for an item category in a retail store, using a constrained linear regression model; calculating a cross-space elasticity for the item category in the retail store, using a multiple non-linear regression model; generating a category space allocation for the item category in the retail store, using a non-linear multiple-constraint mixed integer optimization model, based on the space elasticity of the item category and the cross-space elasticity of the item category; and generating an electronic planogram for the retail store, based on the category space allocation of the item category.

A non-transitory computer-readable storage medium configured as disclosed herein can have instructions stored which, when executed by a computing device, cause the computing device to perform operations which include: calculating a space elasticity for an item category in a retail store, using a constrained linear regression model; calculating a cross-space elasticity for the item category in the retail store, using a multiple non-linear regression model; generating a category space allocation for the item category in the retail store, using a non-linear multiple-constraint mixed integer optimization model, based on the space elasticity of the item category and the cross-space elasticity of the item category; and generating an electronic planogram for the retail store, based on the category space allocation of the item category.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Systems, methods, and computer-readable storage media configured according to this disclosure are capable of recommending item category footage (space) allocated in a retail store, which may provide a process for arranging item categories on shelves in the retail store. Optimized category space allocation using conventional methods can be recommended to increase the overall revenue in a product department or in a retail store. However, different categories may behave differently in terms of change in sales for similar change in footage. Also the space allocated to the categories in the department or retail store can influence each other positively or negatively in terms of change in demand. This may lead to learn the relationship between space and sales both individually for each category as well as their inter-relationships. As used herein, the "sale" and "demand" are interchangeable. The "category space/footage" may refer to the number of the horizontal footage allocated to the category for displaying the category on a fixture (e.g., one or more shelves) in a retail store.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth.

When creating a planogram, allocation of space for each category may be one of the primary areas of focus. However, the display space allocated to a category may have a different influence on sales with respect to different categories. In some embodiments, optimization using space elasticity may be provided. As used herein, space elasticity of a category may be defined to indicate a relationship between space allocation of the category and observed demand of the category. That is, the measurement of the impact on a category's sales performance by increasing or decreasing its allocation of space, for example, within a shelf, may be reflected by the space elasticity of the category. Space elasticity may be impacted by many variables, including types of the category, brands, price, seasonality, etc. A high space elasticity value may indicate that the category sales can be greatly affected by change in space allocation of the category.

Figure 1:
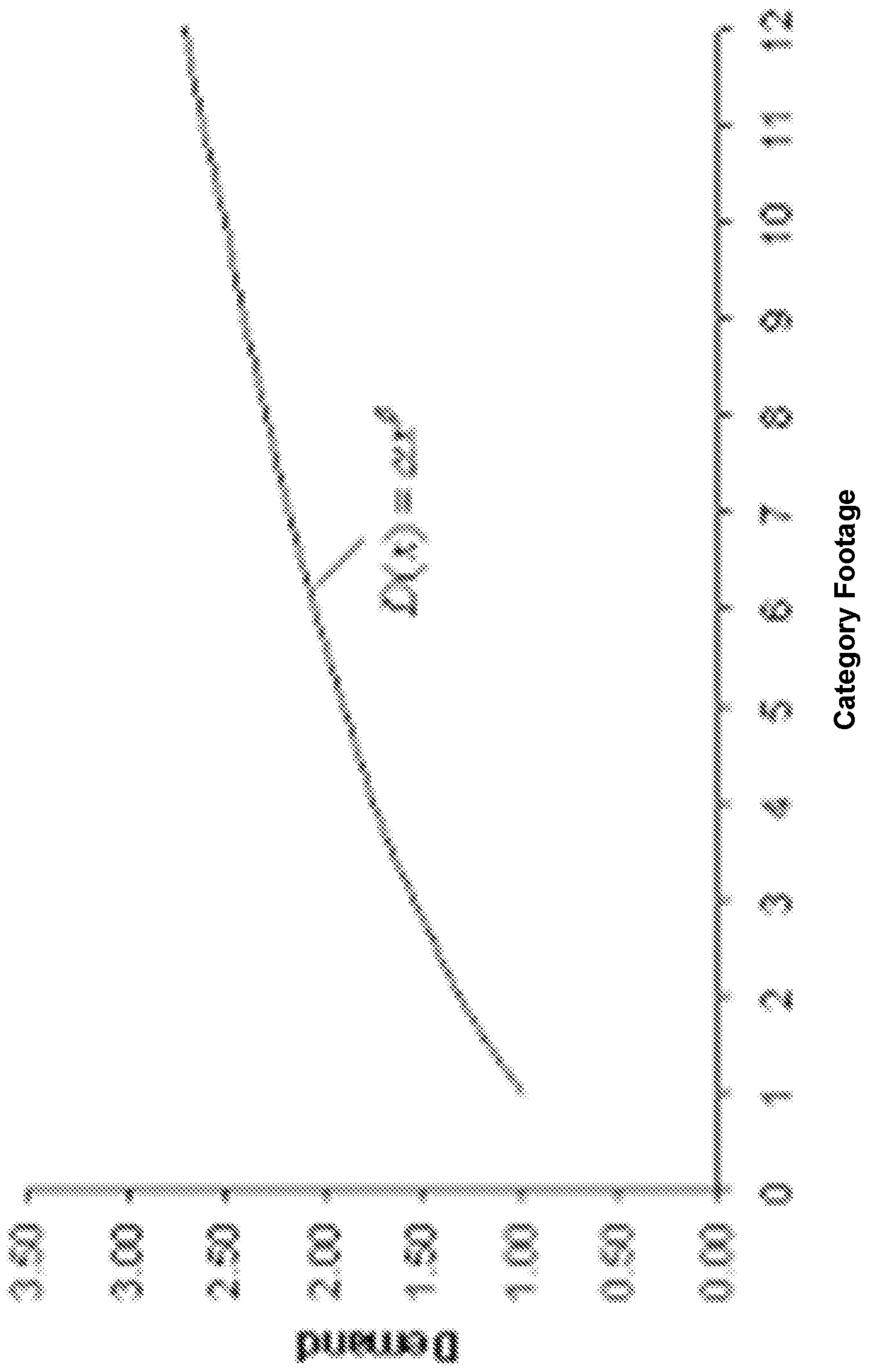
FIG. 1 illustrates an exemplary diagram of an assumed model correlating allocated item category space and demand share of the item category, according to one embodiment of the present disclosure.

Category space elasticity may enable retailers to map demand data against space variables and generate the associated space elasticity of demand curves. FIG. 1 illustrates an exemplary diagram of a model correlating category footage and demand based on space elasticity of the category, according to one embodiment of the present disclosure. The model may take a general form as sales share (demand)~function (elasticity, space share).

In this embodiment, the model may take a polynomial form. For the ith category:

$$D(i)=a(i)*(x(i)\hat{\ }b(i)),\text{ where } a=>0,\text{ and } 0<=b<=1$$

where D(i) is the demand share of the ith category, x(i) is the number of horizontal footage of the ith category, a(i) is a scale parameter, b(i) is the space elasticity of the ith category. As can be seen from FIG. 1, the sales of the ith category may increase with an increase in the space allocated (footage) of the ith category, but the rate of increase may diminish gradually.

In some embodiments, through a transformation, the above model form may be written as: Log(D(i))=log(a(i))+b(i)*log(x(i)), so that the parameters (i.e., a and b) can then be estimated by a constrained linear regression (i.e., a=>0, and 0<=b<=1).

Other variables may also impact the demand of a category, such as store location, and shelf height. The above model may be expanded to include an effect of the total modular footage per shelf and the number of shelves of a retailer store. Other explanatory variables like store clusters may also be added to improve the model. For example, let L and S denote the linear footage of a shelf and the number of shelves of the store, and c(i) and d(i) are parameters indicating effects of the linear footage L and the number S of shelves on the sales, respectively, the updated model may be log(D(i))=log(a(i))+b(i)*log(x(i))+c(i)*log(L)+d(i)*log (S), which may be subject to constraints: 0<=b(i)<=1. Thus, category space elasticity may be measured, mapped and utilized to enable retailers to predict profit return on space.

In some embodiments, the actual sales data of categories may be validated against the model assumptions to check the proportion of conformity of the model, and accordingly the variables/parameters may be updated to improve the model's validation and accuracy. The proportion of conformity can measure the categories, for which, unconstrained regression model parameter estimates, conform or match with the model assumptions of a>0, 0<b<1.

In other embodiments, instead of the actual sales, category share of sales and share of space may be used for examining compliance of a model. Specifically, instead of regressing the logarithm of actual category sales on logarithm of actual category space, the share of sales and space are used. For example, a category X has sales of $20M, and has 10 items. Item 1 has sales $1M, so item 1 has a share of sales 1/20, i.e. 5% sales share. Similarly out of 20 ft allocated to category X, 2 ft is allocated to item 1, so the item 1 has 2/20, i.e. 10% space share. Using these modified features, improved accuracy and model conformity can be obtained.

Also the model mentioned above can be simplified to the following two cases: effect of total space instead of separated effects of number of shelves and footage per shelf, i.e., c(i)=d(i); and elasticity calculated as effect of space share, i.e., c(i)=d(i)=−b(i). The parameters c and d represent the effects of number of shelves and shelf footages. When the share of space instead of the actual space is considered, a new variable is created: space share=facings/(number of shelves*shelf footages). So inherently the unknown variables c and d are the same in magnitude as the elasticity parameter b and of opposite sign. For a set of universal product codes (UPCs), the UPCs that demonstrate the model's compliance (referred to as the compliant UPCs), may be analyzed using a linear regression model, while constrained regression may be used for the other UPCs that do not demonstrate the model's compliance. The results can be validated on categories of UPCs, as shown in Table 1 below.

| Model Variables | Compliance |
|---|---|
| Total Sales | 11% |
| Sales Share | 54% |
| Total space | 62% |
| Share of facings | 80% |

Figure 2:
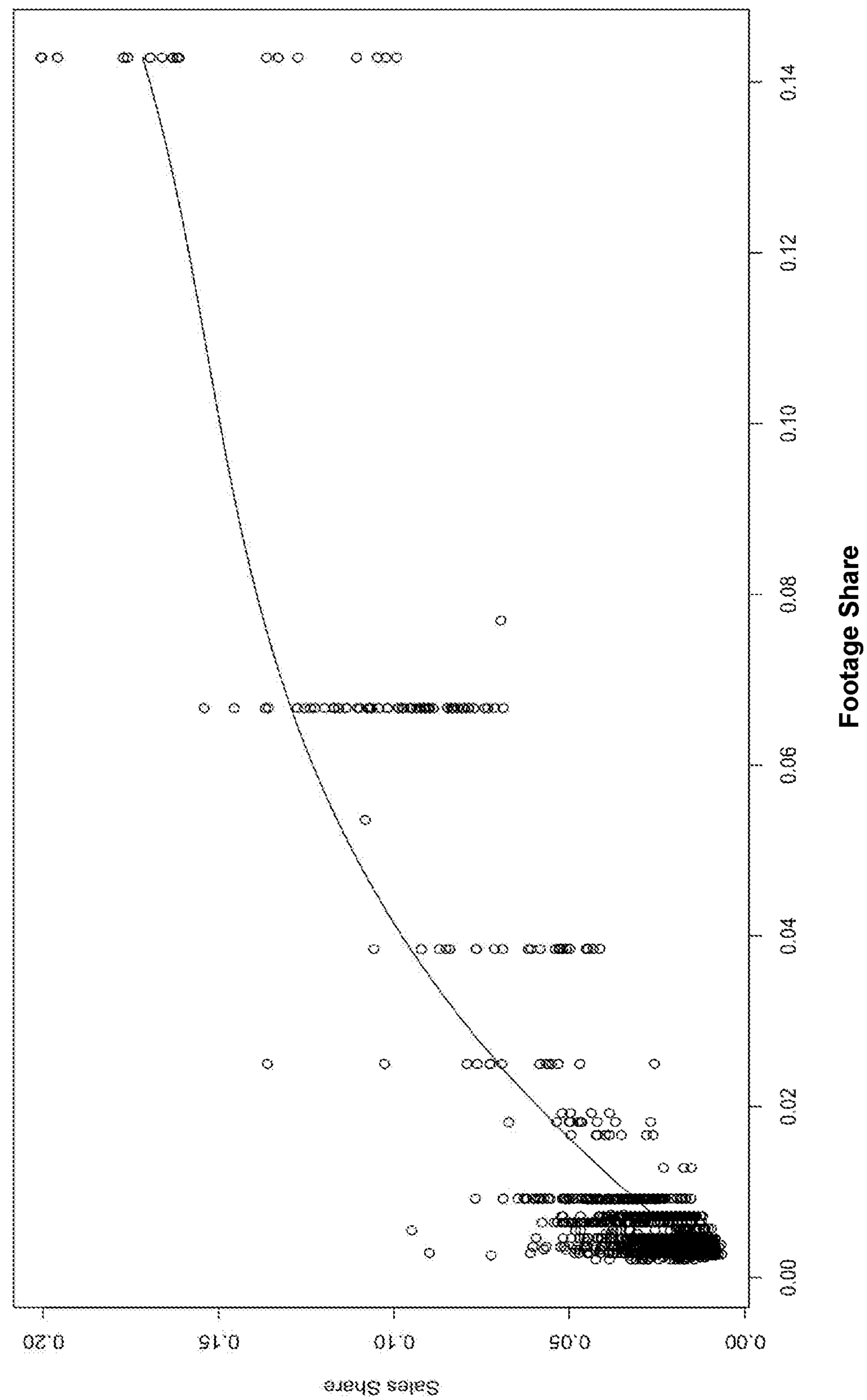
FIG. 2 illustrates an exemplary diagram of a modified model correlating allocated item category space and demand share of the item category, based on actual data, according to one embodiment of the present disclosure.

FIG. 2 illustrates an exemplary diagram of a modified model correlating category footage and demand, based on actual data, according to one embodiment of the present disclosure. As can be seen from FIG. 2, the model fits the data well. By fitting this model on the data, the space elasticity of each category may be estimated, with the constraint of 0<=space elasticity of category <=1.

Figure 3:
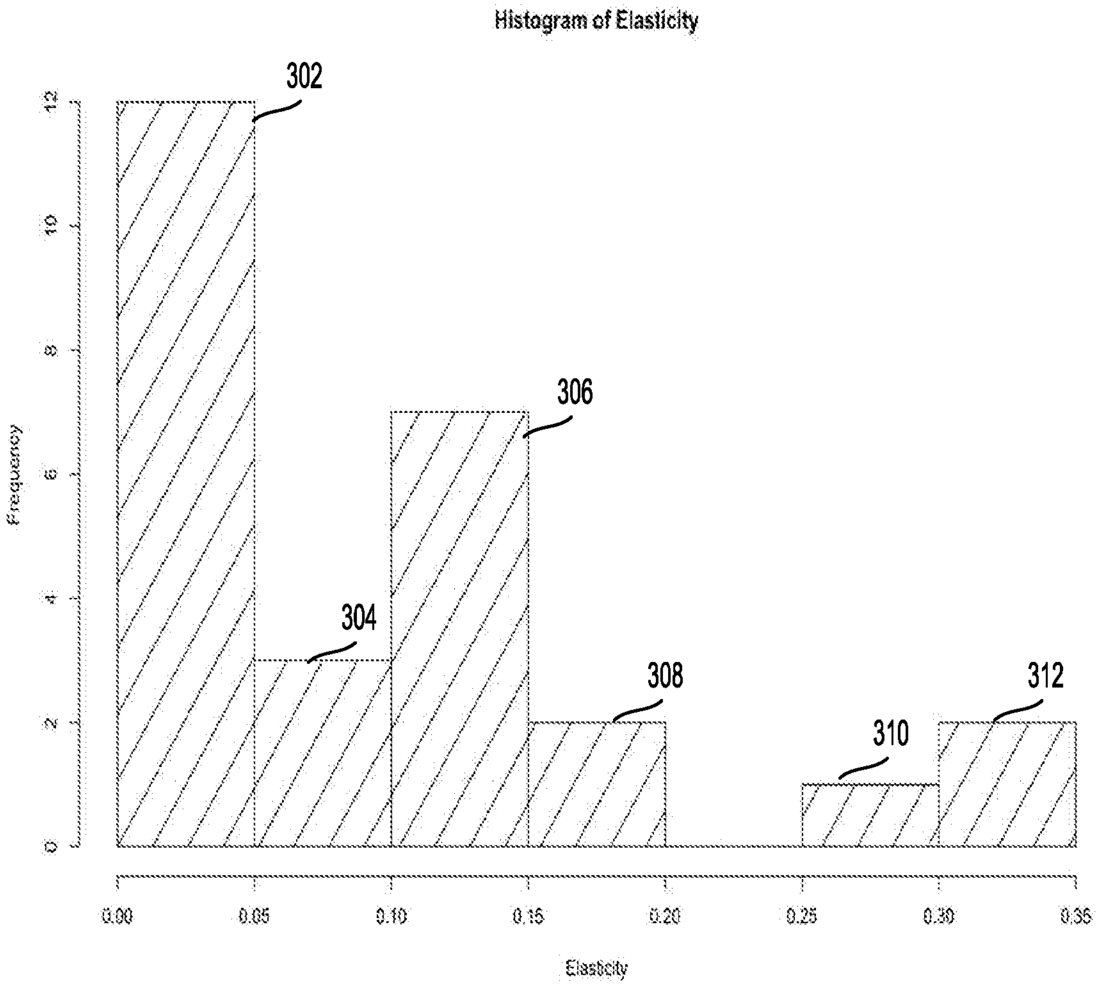
FIG. 3 illustrates an exemplary histogram of category space elasticity calculated using a model, according to one embodiment of the present disclosure.

FIG. 3 illustrates an exemplary histogram of category space elasticity calculated using a model, according to one embodiment of the present disclosure. In this embodiment, 27 UPCs are used to fit the model, the distribution of elasticity results are as shown in FIG. 3. As can be seen, 12 UPCs have a space elasticity value ranging from 0 to 0.05 (302); 3 UPCs have a space elasticity value ranging from 0.05 to 0.1 (304); 7 UPCs have a space elasticity value ranging from 0.1 to 0.15 (306); 2 UPCs have a space elasticity value ranging from 0.15 to 0.20 (308); 1 UPCs has a space elasticity value ranging from 0.25 to 0.30 (310); and 2 UPCs have a space elasticity value ranging from 0.3 to 0.35 (312). This model may explain about 74% of the variability on demand on an average.

The relative change in sales of a category may be very much dependent on the space allocated to that category. But the space allocated to the other categories in the same department/store can also have some influence over it. That is, the space allocated to categories in a department/store may influence each other positively or negatively in terms of change in demand. To take into this effect, a cross-space elasticity of the category may be used in determining space allocation. As used herein, the cross-space elasticity may be referred to as a change in demand of one category in response to the change in space of the other categories.

Typically, substitutes may have a negative cross-space elasticity on a category, whereas complements (or variety substitutes) may have a positive cross-space elasticity on the category. For example, the cross-space elasticity of local Spirits on canned Spirits (traditional substitute) can be −0.014 and beer on the canned Spirits (variety substitute) can be 0.03.

In some embodiments, the model for calculation for space elasticity of a category may be expanded to a multiple regression problem by including the footage allocations of the other categories in the department/store as features. This may transform the demand model to a parameter-heavy complex model, which can be solved using least absolute shrinkage and selection operator (LASSO) regression, to avoid over-fitting. In addition, the variable-selection property of this model may be beneficial in picking out the relatively important categories which influence the demand of the target category. For some embodiment, on an average, this model can explain 95.38% variability in demand shares.

Figure 4:
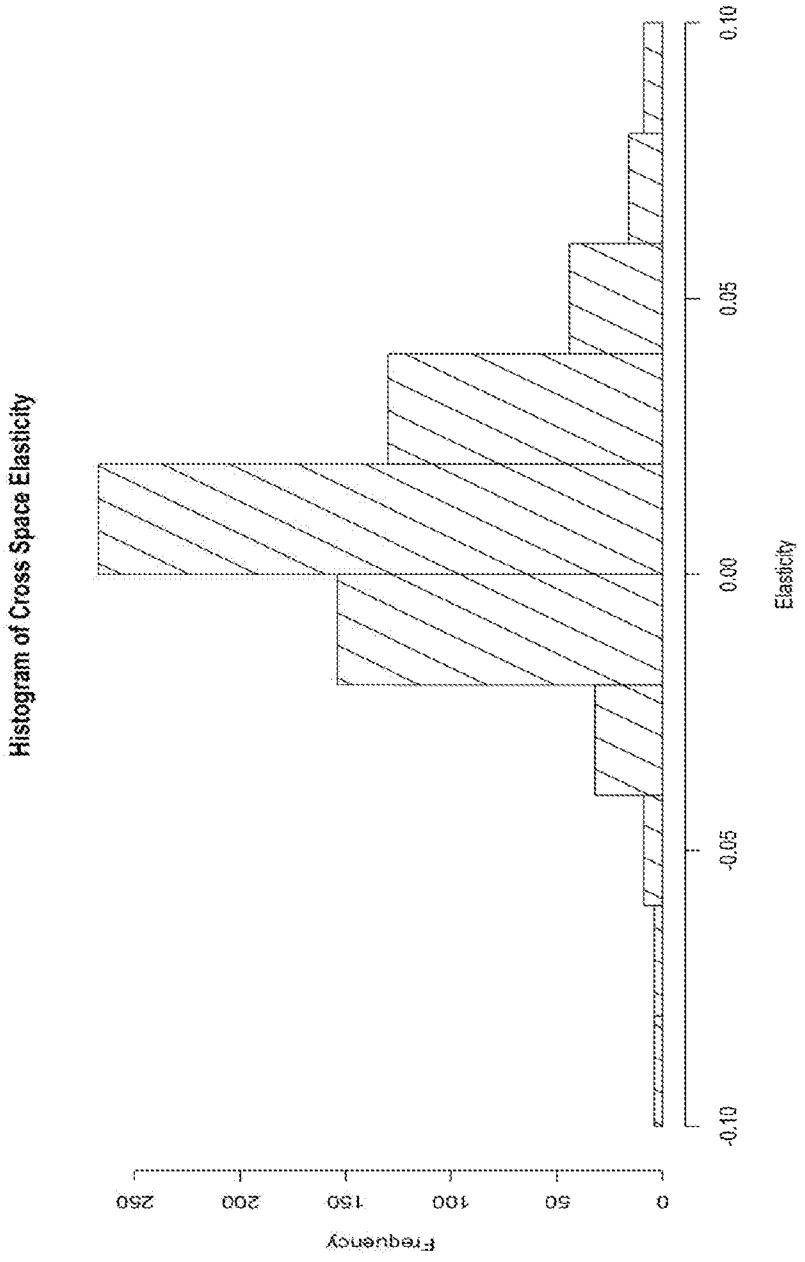
FIG. 4 illustrates an exemplary histogram of category cross-space elasticity calculated using a model, according to one embodiment of the present disclosure.

FIG. 4 illustrates an exemplary histogram of category cross-space elasticity calculated using a model, according to one embodiment of the present disclosure. As can be seen from FIG. 4, some categories have negative cross-space elasticity on other categories of the same department; some categories have positive cross-space elasticity on other categories of the same department. As defined the above, a negative cross-space elasticity may indicate that demand for a category may be negatively affected by its replacement with another category of the same department. Similarly, a positive cross-space elasticity may indicate that demand for a category may be positively affected by its replacement with another category of the same department.

The space elasticity and cross-space elasticity may then be used to determine the optimal number of footage allocation of each category in a department/store, that is, to determine category space, such that the overall revenue of the department/store may be increased. For determining the optimal number of footage allocation, the vertical and depth space of categories may be assumed as constant for each category based on the shelf space availability of the store. The following non-linear, multi-constraint optimization problem can be solved to arrive at these recommendations: maximize: Total Revenue~function (category footage, space elasticity, cross-space elasticity): such that category footage is a bounded integer and sum (category footage)=department footage. Specifically:

Maximize:

$$R = \sum_{i=1}^{n} \left(p_i a_i \left(\frac{x_i}{L*S}\right)^{b_1} \prod_{j=1 \neq i}^{n} \left(\frac{x_j}{L*S}\right)^{g_{ij}}\right),$$

that is, total revenue R of the department may be maximized. The total revenue R can refer to as a sum of unit price of each category*demand for each category.

where, $$\sum_{i=1}^{n} x_i f_i = L*S$$

is a vector having elements L that is the total linear footage per shelf, and S is a vector having elements S that is the number of shelves. That is, L*S represents a sum of total allocated space for categories of the department that is equal to the total available space.

$lb_i$<=$x_i$<=$ub_i$ may indicate that horizontal footage of ith category may be bounded by business constraints.

$x_i$'s are positive integers, $p_i$ is the unit price, $x_i$ is the horizontal footage, $f_i$ is the front-facing length of ith category, L is the total linear footage per shelf and S is the number of shelves. $a_i$, $b_i$ are parameters which were solved in the earlier elasticity model and $g_{ij}$ is the cross-space elasticity of ith category on jth category. $lb_i$ and $ub_i$ are respectively the lower and upper bounds of horizontal footage of the ith category.

The lower and upper bounds can be derived from business constraints. For one example, 1.5 case pack and 3.5 Days of Supply (DOS) and 1 DOS safety stock may be used as constraints, to eliminate over-stock and out-of-stock situations:

$$lb_i = \left\lceil \frac{\max(1.5\ CP,\ 1\ DOS\ \text{units})}{vf_i df_i} \right\rceil,$$

$$ub_i = \left\lceil \frac{\max(1.5\ CP,\ 4.5\ DOS\ \text{units})}{vf_i df_i} \right\rceil$$

where 1 DOS units=median of (historical) daily sales, and $vf_i$ and $df_i$ are respectively the vertical and depth footage of the ith category for the chosen modular plan.

Figure 5:
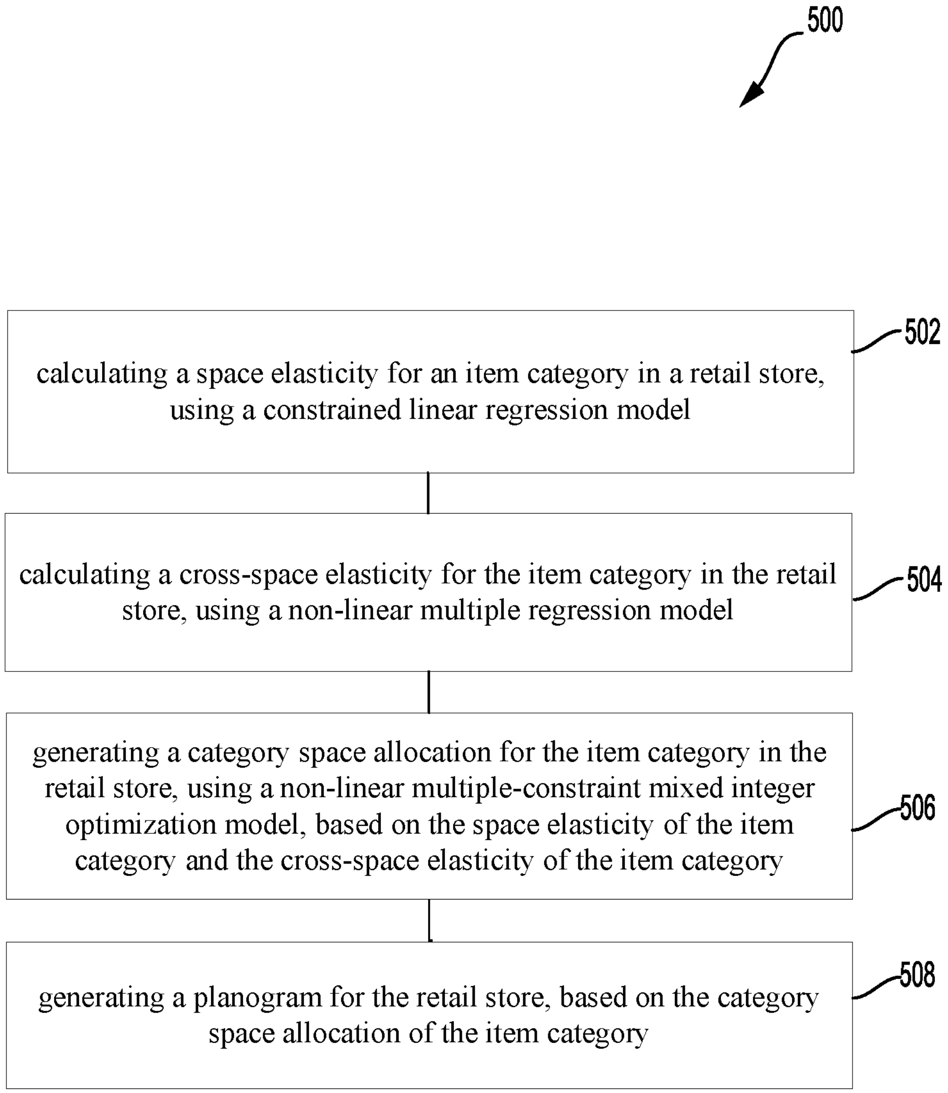
FIG. 5 illustrates an exemplary method of recommending category space in a retail store.

FIG. 5 illustrate an exemplary method 500 of recommending category footage in category department/store. A category of interest is identified. The space elasticity for the category is determined. Cross-space elasticity for the category is determined. The space elasticity and cross space elasticity are then used to determine the optimal number of footage allocated for the category. The method 500 may be implemented in the above disclosed systems, may include the following steps, and thus some details may be repeated herein.

At step 502, a space elasticity for an item category in a retail store is calculated, using a constrained linear regression model. The constrained linear regress model may comprise Log(D)=log(a)+b*log(x), wherein D is a demand of the item category, x is a number of horizontal footage of the item category on one or more shelves in the retail store, a is a scale parameter being =>0, and b is the space elasticity of the item category being 0<=b<=1. The space elasticity of the category may be calculated by fitting the constrained linear regress model on known data between the demand of the item category and the number of horizontal footage of the item category.

The constrained linear regression model may further comprise parameters including a linear horizontal footage of the shelf and a number of the shelves. In addition, the constrained linear regression may further comprise parameters including clusters of the retail store.

At step 504, a cross-space elasticity for the item category in the retail store is calculated, using a non-linear multiple regression model. The multiple non-linear regression model may be derived from the constrained linear regression model by including horizontal footage allocations of other item categories in the retail store. The non-linear multiple regression model may be solved using least absolute shrinkage and selection operator (LASSO) regression analysis method, such that over-fitting of the non-linear multiple regression model is avoided, and relatively important item categories of the retail store which influence a demand of the item category.

At step 506, a category space allocation for the item category in the retail store may be generated, using a non-linear multiple-constraint mixed integer optimization model, based on the space elasticity of the item category and the cross-space elasticity of the item category. The non-linear multiple-constraint mixed integer optimization model may be solved using genetic algorithm.

The non-linear multiple-constraint mixed integer optimization model may comprise $$R=\sum_{i=1}^{n}\left(p_i a_i\left(\frac{x_i}{L*S}\right)^{b_1}\prod_{j=1\neq i}^{n}\left(\frac{x_j}{L*S}\right)^{g_{ij}}\right),$$

wherein: $p_i$ is a unit price of an ith category in the store, $x_i$ is category space allocations of the ith category and is a positive number, L is a linear footage per shelf, S is a number of shelves in the retail store, $a_i$, $b_i$ are parameters which are solved using the constrained linear regression model, $g_{ij}$ is a cross-space elasticity of the ith category on a jth category solved using the multiple regression model; and $lb_i<=x_i<=ub_i$ in which $lb_i$ and $ub_i$ are respectively lower and upper bounds of category space allocation of the ith item category.

The lower and upper bounds may be derived from the business constraints of 1.5 case pack and 3.5 days of supply (DOS), and 1 DOS safety stock, to eliminate over-stock and out-of-stock situations:

$$lb_i=\left\lceil\frac{\max(1.5\ CP,\ 1\ DOS\ \text{units})}{vf_i df_i}\right\rceil,$$

$$ub_i=\left\lceil\frac{\max(1.5\ CP,\ 4.5\ DOS\ \text{units})}{vf_i df_i}\right\rceil+1,$$

in which 1 DOS units=median of (historical) daily sales, $vf_i$ and $df_i$ are respectively vertical and depth footage of the ith item category for the shelf.

At step 508, a planogram of the retail store may be generated, based on the category space allocation of the item category. Such planogram may maximize the revenue R of all categories in the same store/department, as described the above.

Example results by using the above systems and methods are demonstrated on a sample of 8 categories for 297 stores. The projected revenue is demonstrated to have 4.8% gain with 10.94% change in footage allocation and 99.94% average area covered.

Figure 6:
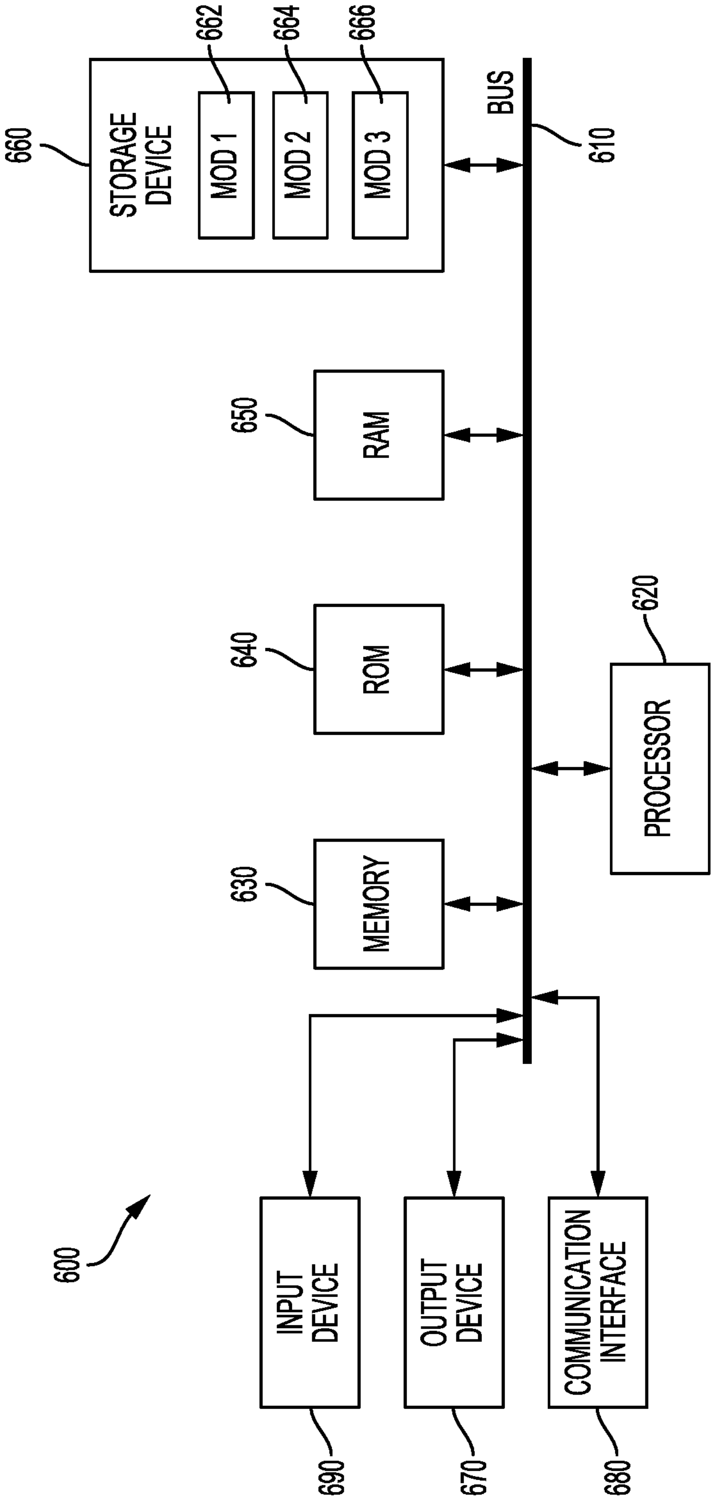
FIG. 6 illustrates an exemplary computer system.

FIG. 6 illustrates an exemplary computer system or device that may perform the above systems and methods. With reference to FIG. 6, an exemplary system 600 can include a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing system 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing system 600, such as during start-up. The computing system 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing system 600. In one aspect, a hardware module that performs a particular function includes the software component stored in a tangible computer-readable storage medium in connection with the necessary hardware components, such as the processor 620, bus 610, output device 670 as display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the system 600 is a small, handheld computing device, a desktop computer, or a computer server.

Although the exemplary embodiment described herein employs the hard disk as the storage device 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing system 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing system 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A computer-implemented method for generating an electronic planogram optimized for space elasticity, comprising:

training a constrained linear regression model using a first training dataset including item category demand and shelf-space for each item category of a first plurality of item categories including compliant items;

training a multiple non-linear regression model based on a second training dataset including, for each item category in the first plurality of item categories, the item category demand, an amount of non-zero shelf-space of one or more substitute item categories and/or complimentary item categories, and wherein at least one of the substitute item categories and/or complimentary item categories is non-compliant with respect to the constrained linear regression model;

training a non-linear multiple-constraint mixed integer optimization model based at least in part, on an output of the constrained linear regression model and an output of the multiple non-linear regression model;

generating an electronic planogram optimized for space elasticity by:

for each item category in the first plurality of item categories:

determining a space elasticity for a corresponding item category by fitting the constrained linear regression model on the item category demand of the corresponding item category and a number of horizontal footage associated with the corresponding item category, wherein the item category demand is compliant with respect to the constrained linear regression model;

applying the multiple non-linear regression model to determine a cross-space elasticity for the corresponding item category, wherein the item category demand of the corresponding item category is negatively affected by replacement with a first replacement category of the first plurality of item categories and positively affected by replacement with a second replacement category of the first plurality of item categories;

applying the non-linear multiple-constraint mixed integer optimization model to generate a category space allocation for the corresponding item category in response to receiving the space elasticity and the cross-space elasticity of the corresponding item category; and aggregating the category space allocation for each item category to generate the electronic planogram;

receiving sales data for at least one category of the first plurality of item categories; and validating the electronic planogram based on the received sales data for the at least one category.

2. The method of claim 1, wherein the constrained linear regression model comprises a logarithmic combination of a demand of the item category, a number of horizontal footage of the item category, a scale parameter, and space elasticity of the item category.

3. The method of claim 2, wherein the space elasticity is calculated by fitting the constrained linear regression model on known data between the demand of the item category and the number of horizontal footage of the item category.

4. The method of claim 1, wherein the multiple non-linear regression model is derived from the constrained linear regression model.

5. The method of claim 4, wherein the multiple non-linear regression model is solved using least absolute shrinkage and selection operator (LASSO) regression analysis method.

6. The method of claim 1, wherein the first training dataset further comprises a linear horizontal footage of the shelf-space and a number of shelves for each item category of a first plurality of item categories.

7. The method of claim 1, wherein the first training dataset further comprises clusters for each item category of a first plurality of item categories.

8. The method of claim 1, wherein the non-linear multiple-constraint mixed integer optimization model is solved using a genetic algorithm.

9. A system for generating an electronic planogram optimized for space elasticity, comprising:

a non-transitory memory having instructions stored thereon; and a processor configured to read the instructions to perform operations including:

training a constrained linear regression model using a first training dataset including item category demand and shelf-space for each item category of a first plurality of item categories including compliant items;

training a multiple non-linear regression model based on a second training dataset including, for each item category in the first plurality of item categories, the item category demand, an amount of non-zero shelf-space of one or more substitute item categories and/or complimentary item categories, and wherein at least one of the substitute item categories and/or complimentary item categories is non-compliant with respect to the constrained linear regression model;

training a non-linear multiple-constraint mixed integer optimization model based at least in part, on an output of the constrained linear regression model and an output of the multiple non-linear regression model;

generating an electronic planogram optimized for space elasticity by:

for each item category in the first plurality of item categories:

determining a space elasticity for a corresponding item category by fitting the constrained linear regression model on the item category demand of the corresponding item category and a number of horizontal footage associated with the corresponding item category, wherein the item category demand is compliant with respect to the constrained linear regression model;

applying the multiple non-linear regression model to determine a cross-space elasticity for the corresponding item category, wherein the item category demand of the corresponding item category is negatively affected by replacement with a first replacement category of the first plurality of item categories and positively affected by replacement with a second replacement category of the first plurality of item categories;

applying the non-linear multiple-constraint mixed integer optimization model to generate a category space allocation for the corresponding item category in response to receiving the space elasticity and the cross-space elasticity of the corresponding item category; and aggregating the category space allocation for each item category to generate the electronic planogram;

receiving sales data for at least one category of the first plurality of item categories; and validating the electronic planogram based on the received sales data for the at least one category.

10. The system of claim 9, wherein the constrained linear regression model comprises a logarithmic combination of a demand of the item category, a number of horizontal footage of the item category, a scale parameter, and space elasticity of the item category.

11. The system of claim 10, wherein the space elasticity is calculated by fitting the constrained linear regression model on known data between the demand of the item category and the number of horizontal footage of the item category.

12. The system of claim 9, wherein the multiple non-linear regression model is derived from the constrained linear regression model.

13. The system of claim 12, wherein the multiple non-linear regression model is solved using least absolute shrinkage and selection operator (LASSO) regression analysis method.

14. The system of claim 9, wherein the first training dataset further comprises a linear horizontal footage of the shelf-space and a number of shelves for each item category of a first plurality of item categories.

15. The system of claim 9, wherein the first training dataset further comprises clusters for each item category of a first plurality of item categories.

16. The system of claim 9, wherein the non-linear multiple-constraint mixed integer optimization model is solved using a genetic algorithm.

17. A non-transitory computer readable medium having instructions store thereon, wherein the instructions, when executed by at least one processor, cause at least one device to perform operations comprising:

training a constrained linear regression model using a first training dataset including item category demand and shelf-space for each item category of a first plurality of item categories including compliant items;

training a multiple non-linear regression model based on a second training dataset including, for each item category in the first plurality of item categories, the item category demand, an amount of non-zero shelf-space of one or more substitute item categories and/or complimentary item categories, and wherein at least one of the substitute item categories and/or complimentary item categories is non-compliant with respect to the constrained linear regression model;

training a non-linear multiple-constraint mixed integer optimization model based at least in part, on an output of the constrained linear regression model and an output of the multiple non-linear regression model;

generating an electronic planogram optimized for space elasticity by:

for each item category in the first plurality of item categories:

determining a space elasticity for a corresponding item category by fitting the constrained linear regression model on the item category demand of the corresponding item category and a number of horizontal footage associated with the corresponding item category, wherein the item category demand is compliant with respect to the constrained linear regression model;

applying the multiple non-linear regression model to determine a cross-space elasticity for the corresponding item category, wherein the item category demand of the corresponding item category is negatively affected by replacement with a first replacement category of the first plurality of item categories and positively affected by replacement with a second replacement category of the first plurality of item categories;

applying the non-linear multiple-constraint mixed integer optimization model to generate a category space allocation for the corresponding item category in response to receiving the space elasticity and the cross-space elasticity of the corresponding item category; and aggregating the category space allocation for each item category to generate the electronic planogram;

receiving sales data for at least one category of the first plurality of item categories; and validating the electronic planogram based on the received sales data for the at least one category.

18. The non-transitory computer readable medium of claim 17, wherein the constrained linear regression model comprises a logarithmic combination of a demand of the item category, a number of horizontal footage of the item category, a scale parameter, and space elasticity of the item category.

19. The non-transitory computer readable medium of claim 18, wherein the space elasticity is calculated by fitting the constrained linear regression model on known data between the demand of the item category and the number of horizontal footage of the item category.

20. The non-transitory computer readable medium of claim 17, wherein the multiple non-linear regression model is derived from the constrained linear regression model.

* * * * *